(12) United States Patent
Werner et al.

(10) Patent No.: US 11,489,344 B2
(45) Date of Patent: Nov. 1, 2022

(54) ALTERING BATTERY CHARGING RATE BASED ON PHYSICAL ACTIVITY

(71) Applicant: International Business Machines Corporation, Armonk, NY (US)

(72) Inventors: John S. Werner, Fishkill, NY (US); Enver Candan, Wappingers Falls, NY (US); Brianna Malcolm, Hyde Park, NY (US); Matthew Alzamora, Poughkeepsie, NY (US); Hanami Robles Chacon, Poughkeepsie, NY (US); Richard Burton Finch, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 16/814,082

(22) Filed: Mar. 10, 2020

(65) Prior Publication Data
US 2021/0288509 A1 Sep. 16, 2021

(51) Int. Cl.
*H01M 10/44* (2006.01)
*H01M 10/46* (2006.01)
*H02J 7/00* (2006.01)

(52) U.S. Cl.
CPC .......... *H02J 7/00041* (2020.01); *H02J 7/005* (2020.01); *H02J 7/00034* (2020.01); *H02J 7/0048* (2020.01); *H02J 7/0071* (2020.01)

(58) Field of Classification Search
CPC .. H02J 7/00041; H02J 7/0048; H02J 7/00034; H02J 7/005; H02J 7/0071
USPC ........ 320/132, 106, 130, 133, 150, 151, 152
See application file for complete search history.

(56) References Cited

U.S. PATENT DOCUMENTS

| | | | |
|---|---|---|---|
| 5,754,029 A | 5/1998 | Mann | |
| 8,207,740 B2* | 6/2012 | Lin | ...................... H01M 10/441 320/119 |
| 9,430,021 B2 | 8/2016 | Lu | |
| 11,177,693 B1* | 11/2021 | Puskarich | ............. H02J 7/0044 |
| 2008/0218126 A1* | 9/2008 | Bansal | .................. H02J 7/0069 320/132 |

(Continued)

FOREIGN PATENT DOCUMENTS

| | | |
|---|---|---|
| CN | 103914118 A | 7/2014 |
| EP | 1251619 B1 | 9/2006 |
| ES | 2555290 T3 | 12/2015 |

OTHER PUBLICATIONS

Disclosed Anonymously, "Machine Learning for Accurate Battery Run Time Prediction", An IP.com Prior Art Database Technical Disclosure, IP.com No. IPCOM000252001D, IP.com Electronic Publication Date: Dec. 13, 2017, 39 pages.

*Primary Examiner* — Edward Tso
(74) *Attorney, Agent, or Firm* — Stephanie L. Carusillo (57) ABSTRACT

In an approach for selecting a battery charging rate, a processor, responsive to an electronic device with a rechargeable battery being connected to a battery charging device, identifies a current battery status of the rechargeable battery. A processor determines a disconnect time of the battery charging device. A processor determines a charge level required. A processor determines a charging profile based on the current battery status, the disconnect time of battery charging device, and the charge level required. A processor sends the charging profile to the battery charging device.

17 Claims, 6 Drawing Sheets

(56) References Cited

U.S. PATENT DOCUMENTS

| | | | |
|---|---|---|---|
| 2011/0018679 A1* | 1/2011 | Davis | H02J 7/0071 320/155 |
| 2012/0256588 A1* | 10/2012 | Hayashi | B60L 53/14 320/109 |
| 2013/0342173 A1* | 12/2013 | Das | H02J 7/0071 320/162 |
| 2014/0082384 A1 | 3/2014 | De Cesare | |
| 2014/0139192 A1 | 5/2014 | Berkowitz | |
| 2015/0380954 A1* | 12/2015 | Poulton | G01R 31/378 320/162 |
| 2016/0064961 A1 | 3/2016 | Dicarlo | |
| 2019/0356137 A1 | 11/2019 | Balarajashetty | |
| 2020/0303938 A1* | 9/2020 | Owen | H02J 7/00034 |

* cited by examiner

ALTERING BATTERY CHARGING RATE BASED ON PHYSICAL ACTIVITY

BACKGROUND

The present invention relates generally to the field of rechargeable batteries, and more particularly to altering battery charging rate based on physical activity.

Electronic devices with rechargeable batteries (e.g., mobile phones, wearable electronics, headphones, vehicles) typically charge at different rates. Standard chargers may supply 1A of current, while rapid or quick chargers may supply 2A of current. Users may charge their electronic devices multiple times per day for different durations so that the battery does not fully deplete. For example, users may charge their device overnight for 8 hours, for 30 min while driving, for an hour while at work, etc.

Generally, a battery will charge optimally and have a longer lifespan when charged at a slower rate, however, charging at a slower rate may not give the user enough charge capacity to make it through their day. For example, if a batter has 20% capacity remaining, the user may wish to charge their device for 15 minutes before going out to ensure the battery does not run out. In this example, fast charging would be more optimal to bring the charge level up to 50% rather than a slow charge that may only charge the battery up to 25%. If this is done frequently, the battery will have a shorter lifespan. In another example, if a battery has 20% capacity remaining, the user may wish to charge their device over the last 2 hours of their workday. In this case, slow charging would be more optimal to bring the charge level up to 100%. If this is done frequently, the device battery will have a longer lifespan.

SUMMARY

Aspects of an embodiment of the present invention disclose a method, computer program product, and computer system for selecting a battery charging rate. A processor, responsive to an electronic device with a rechargeable battery being connected to a battery charging device, identifies a current battery status of the rechargeable battery. A processor determines a disconnect time of the battery charging device. A processor determines a charge level required. A processor determines a charging profile based on the current battery status, the disconnect time of battery charging device, and the charge level required. A processor sends the charging profile to the battery charging device.

DETAILED DESCRIPTION

Embodiments of the present invention recognize that a battery will charge optimally and have a longer lifespan when charged at a slower rate, however, charging at a slower rate may not give the user enough charge capacity to make it through their day. Currently, one solution focuses on device utilization as an input for selecting a charge profile when charging a device battery, but this does not take into account when a user has the ability to simply charge their device during usage. For example, in some instances of high device utilization, the user may be near an outlet or charging station and easily is able to charge their device. Also, this solution does not work for devices like battery powered vehicles. Embodiments of the present invention recognize the need for a method for determining an optimal charge rate that adapts to a specific user's lifestyle and extends the lifespan of a battery as much as possible.

Embodiments of the present invention create and utilize an activity profile for a user of an electronic device based on movement of the electronic device in relation to linked peripheral devices. The activity profile can be utilized to estimate a likely amount of time that the electronic device will have to charge and how much battery capacity is needed for a certain amount of time, e.g., amount of time until the user is near a charger again. Embodiments of the present invention select an optimal charge rate for the electronic device's battery based on the activity profile to provide the user with enough battery capacity to make it a certain amount of time while increasing the lifespan of the battery.

Embodiments of the present invention further determine an optimal charge current for an electronic device based on communications with a charger circuit based on data transferred from the electronic device.

The present invention may contain various accessible data sources, such as device 110 and peripheral device(s) 150, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. User activity profile program 125 and charging profile selection program 130 enable the authorized and secure processing of personal data. User activity profile program 125 and charging profile selection program 130 provide informed consent, with notice of the collection of personal data, allowing the user to opt in or opt out of processing personal data.

Consent by a user can take several forms. Opt-in consent can impose on the user to take an affirmative action before personal data is processed. Alternatively, opt-out consent can impose on the user to take an affirmative action to prevent the processing of personal data before personal data is processed. User activity profile program 125 and charging profile selection program 130 provide information regarding personal data and the nature (e.g., type, scope, purpose, duration, etc.) of the processing. User activity profile program 125 and charging profile selection program 130 provide the user with copies of stored personal data. User activity profile program 125 and charging profile selection program 130 allow the correction or completion of incorrect or incomplete personal data. User activity profile program 125 and charging profile selection program 130 allow the immediate deletion of personal data.

The present invention will now be described in detail with reference to the Figures.

Figure 1:
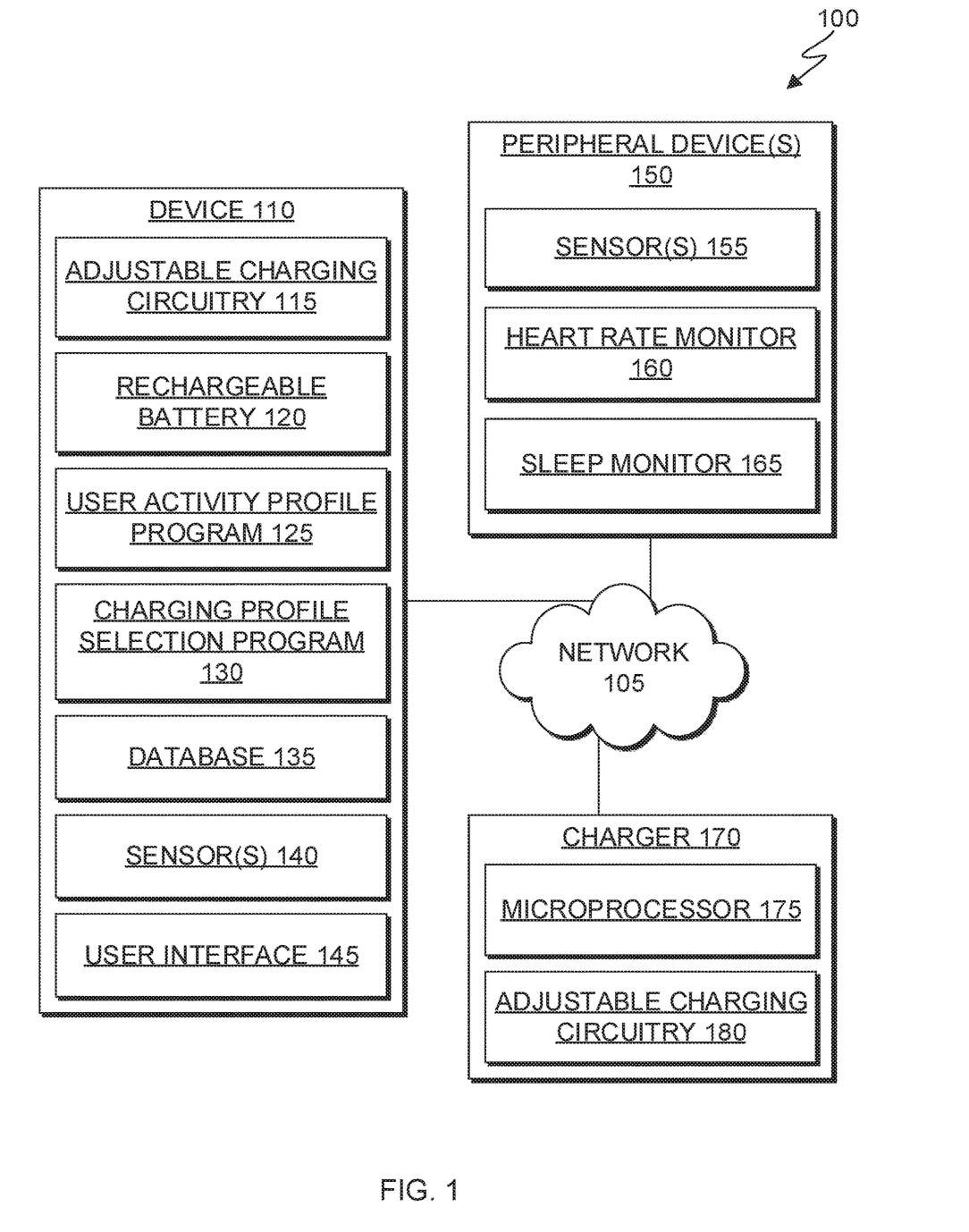
FIG. 1 depicts a block diagram of a distributed data processing environment, in accordance with an embodiment of the present invention.

FIG. 1 depicts a functional block diagram illustrating distributed data processing environment 100, in accordance with an embodiment of the present invention. The term "distributed" as used herein describes a computer system that includes multiple, physically distinct devices that operate together as a single computer system. FIG. 1 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

In the depicted embodiment, distributed data processing environment 100 includes device 110, peripheral device(s) 150, and charger 170 interconnected over network 105. Network 105 can be, for example, a local area network (LAN), a wide area network (WAN) such as the Internet, or a combination of the two, and can include wired, wireless, or fiber optic connections. In an embodiment, network 105 can support a wired (e.g., serial/parallel or ethernet) or wireless networking protocol (e.g., Bluetooth®, Wi-Fi, or near field communication (NFC)) for communication between device 110 and peripheral device(s) 150. In an embodiment, network 105 can support a wired (e.g., USB) or wireless (e.g., inductive) communication between device 110, peripheral device(s) 150, and charger 170. In general, network 105 can be any combination of connections and protocols that will support communications between device 110, peripheral device(s) 150, and charger 170. Distributed data processing environment 100 may include additional servers, computers, or other devices not shown.

Device 110 operates as an electronic device that runs charging profile selection program 125. In the depicted embodiment, device 110 contains adjustable charging circuitry 115, rechargeable battery 120, user activity profile program 125, charging profile selection program 130, database 135, sensor(s) 140, and user interface 145. In some embodiments, device 110 can be an electronic device or computing system capable of receiving and sending data. In some embodiments, device 110 may be a laptop computer, tablet computer, netbook computer, personal computer (PC), a desktop computer, a smart phone, hybrid or electric vehicle, or any programmable electronic device capable of communicating with peripheral device(s) 150 and charger 170 via network 105. In an embodiment, device 110 represents an electronic device associated with one or more users. Device 110 may include components as described in further detail in FIG. 6.

Adjustable charging circuitry 115 operates as battery charging circuitry with adjustable output power. In an embodiment, adjustable charging circuitry 115 is built directly into device 110. In other embodiments (not shown), where space for additional charging circuitry may be limited (e.g., a mobile phone), device 110 does not include adjustable charging circuitry 115. In these other embodiments (not shown), adjustable charging circuitry 115 is included in an external charger, e.g., charger 170.

Rechargeable battery 120 operates as a rechargeable battery providing the power required to operate device 110. In an embodiment, rechargeable battery 120 can be a rechargeable battery as known to a person of skill in the art, e.g., lithium-ion ($Li^+$), silver-zinc ($AgZn_3$), lithium-sulfur (Li—S), aluminum-graphite ($Al_4C_3$), fluorine-ion ($F^-$), etc.

User activity profile program 125 operates to monitor user activity and create/update user activity profiles. A user activity profile is created and updated by user activity profile program 125 for each user of device 110 with the goal of developing a profile of daily user activity to help charging profile selection program 130 determine a charging profile for charger 170 when charger 170 is connected to an electronic device, e.g., device 110 or peripheral device(s) 150. In an embodiment, user activity profile program 125 utilizes a neural network to create and update a user activity profile based on the user activity data collected on device 110 and peripheral device(s) 150. In the depicted embodiment, user activity profile program 125 resides on device 110. In other embodiments, user activity profile program 125 may reside on another device (not shown), i.e., a remote server, with user interface 145 being the local app interface of user activity profile program 125, provided that user activity profile program 125 has access to network 105. User activity profile program 125 is described in more detail below with reference to FIGS. 2 and 3.

Charging profile selection program 130 operates to select a charging profile based on user activity profiles for one or more users of an electronic device. A charging profile is a charging rate for charger 170 to use when connected to an electronic device, e.g., device 110 or peripheral device(s) 150. In an embodiment, charging profile selection program 130 determines a charging profile to implement based on a current battery status and an expected or estimated time of charger disconnect. In an embodiment, charging profile selection program 130 selects between a fast charging profile and a slow charging profile. In other embodiments, charging profile selection program 130 selects between three or more charging profiles with varying charging rates. In the depicted embodiment, charging profile selection program 130 resides on device 110. In other embodiments, charging profile selection program 130 may reside on another device (not shown), i.e., a remote server, with user interface 145 being the local app interface of charging profile selection program 130, provided that charging profile selection program 130 has access to network 105. In an embodiment, peripheral device(s) 150 include a local app interface of charging profile selection program 130. Charging profile selection program 130 is described in more detail below with reference to FIG. 4.

Database 135 operates as a repository for data received, used, and/or output by charging profile selection program 130. Data received, used, and/or generated may include, but is not limited to, rechargeable battery status including, but not limited to a current state of charge or depth of charge, current temperature, current state of health of the battery, and/or number of charge-discharge cycles (aging of the battery); a set of charging profiles; a set of user activity profiles; data input by one or more users of device 110 through user interface 145 relating to the set of charging profiles and the set of user activity profiles; data collected by sensor(s) 140 of device 110 relating to the set of charging profiles and the set of user activity profiles; data collected by peripheral device(s) 150 relating to the set of charging profiles and the set of user activity profiles; and any other data received, used, and/or output by user activity profile program 125 and/or charging profile selection program 130.

Database 135 can be implemented with any type of storage device capable of storing data and configuration files that can be accessed and utilized by device 110, such as a hard disk drive, a database server, or a flash memory. In an embodiment, database 135 is accessed by device 110, user activity profile program 125, charging profile selection program 130, and/or peripheral device(s) 150 to store and/or to access the data. In the depicted embodiment, database 135 resides on device 110. In another embodiment, database 135 may reside on another computing device, server, cloud server, or spread across multiple devices elsewhere (not shown) within distributed data processing environment 100, provided that database 135 has access to network 105.

Sensor(s) 140 operate to collect user activity data from one or more users of an electronic device, i.e., device 110. In an embodiment, sensor(s) 140 include, but are not limited to, one or more of an accelerometer, gyroscope, proximity sensor, microphone, and/or camera. In an embodiment, user activity data includes data collected from sensor(s) 140 that is associated with an activity of a user of device 110. In an embodiment, user activity profile program 125 monitors and collects user activity data from sensor(s) 140. In an embodiment, user activity profile program 125 stores collected user activity data from sensor(s) 140 in database 135.

User interface 145 operates as a local user interface on device 110 through which a user can opt-in or opt-out of sharing user data with user activity profile program 125 and/or charging profile selection program 130, fill in data in a user profile, enable user activity profile program 125 to collect user activity data from a calendar application and/or social media applications of device 110. In some embodiments, user interface 145 is a graphical user interface (GUI), a web user interface (WUI), and/or a voice user interface (VUI) that can display (i.e., visually), present (i.e., audibly), and/or enable a user to enter or receive information (such as graphics, text, and/or sound) for or from user activity profile program 125 and/or charging profile selection program 130 via network 105. In an embodiment, user interface 145 enables a user to send and receive data (i.e., to and from user activity profile program 125 via network 105, respectively).

Peripheral device(s) 150 operate as one or more electronic devices that are associated with the one or more users of device 110. In the depicted embodiment, peripheral device(s) 150 contain sensor(s) 155, heart rate monitor 160, and sleep monitor 165. In an embodiment, sensor(s) 155 include, but are not limited to, one or more of an accelerometer, gyroscope, proximity sensor, microphone, and/or camera. In an embodiment, user activity data includes data collected from sensor(s) 155 that is associated with an activity of a user of device 110. In some embodiments (not shown), peripheral device(s) 150 further contain a rechargeable battery for which charging profile selection program 130 determines an optimal charging rate for when connecting to a battery charging device, e.g., charger 170.

In several embodiments, peripheral device(s) 150 are electronic devices or computing systems capable of receiving and sending data. In some embodiments, peripheral device(s) 150 are one or more of a laptop computer, tablet computer, netbook computer, personal computer (PC), a desktop computer, a smart phone, a smart watch, a smart wearable device, a smart e-textile, or any programmable electronic device capable of communicating with device 110 and charger 170 via network 105. In an embodiment, peripheral device(s) 150 represent one or more electronic devices associated with the one or more users of device 110. Peripheral device(s) 150 may include components as described in further detail in FIG. 6.

Charger 170 operates as a wired or wireless battery charging device for electronic devices with a rechargeable battery, e.g., device 110 with rechargeable battery 120 and peripheral device(s) 150. In the depicted embodiment, charger 170 includes microprocessor 175 and adjustable charging circuitry 180. Charger 170 may include components as described in further detail in FIG. 5. In an embodiment, microprocessor 175 operates a switch to select and control an output charge current of adjustable charging circuitry 180 based, at least in part, on a charging profile selection received from charging profile selection program 130 of device 110. In an embodiment, adjustable charging circuitry 180 includes two or more charge circuits that output different currents, e.g., high current for fast charging and low current for slow charging), in which microprocessor 175 controls the switch between the two or more charge circuits. In another embodiment, adjustable charging circuitry 180 includes a single circuit with variable output current, in which microprocessor 175 controls the circuitry to output a desired charge current.

Figure 2:
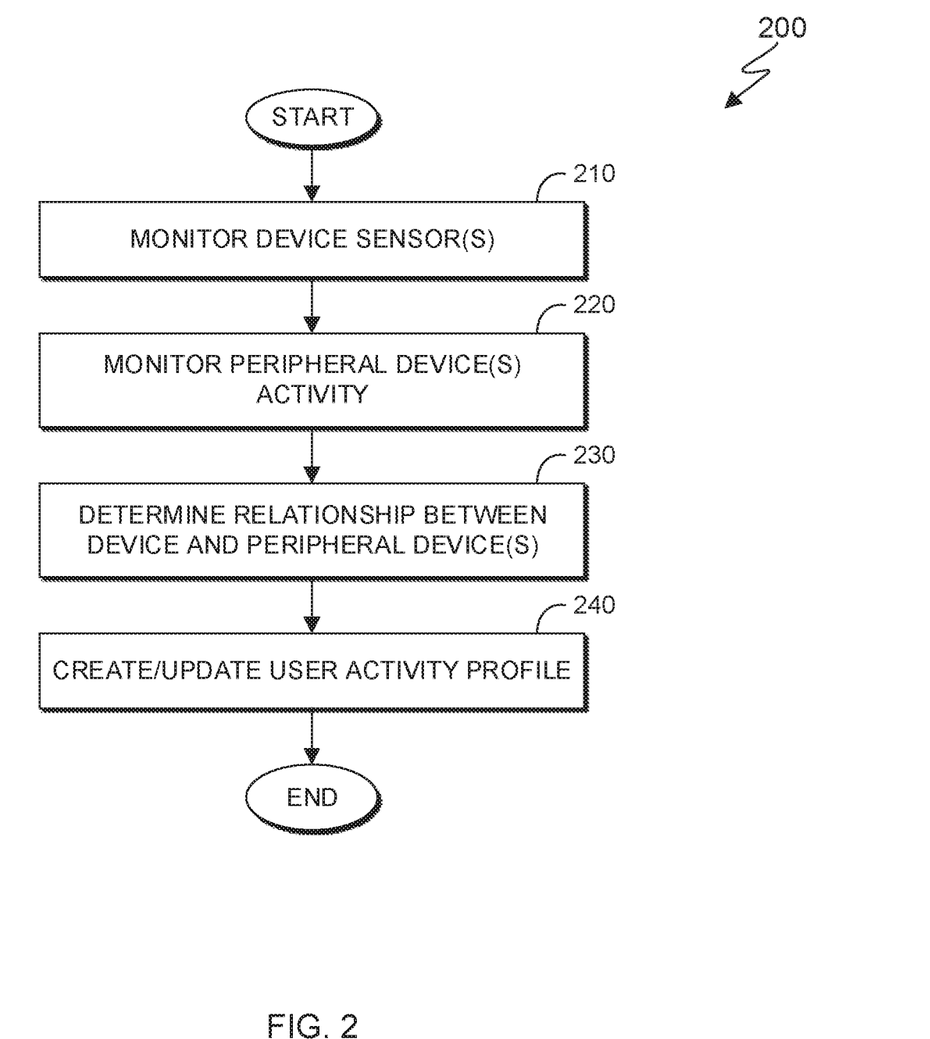
FIG. 2 depicts a flowchart of the steps of a user activity profile program, in accordance with an embodiment of the present invention.

FIG. 2 depicts a flowchart 200 of the steps of user activity profile program 125, in accordance with an embodiment of the present invention. In the depicted embodiment, user activity profile program 125 monitors a user's activity through a user device and peripheral device(s) to create or update a user activity profile. It should be appreciated that the process depicted in FIG. 2 illustrates one possible iteration of user activity profile program 125, which runs continuously to monitor user activity and create/update user activity profiles. In other embodiments (not shown), it should also be appreciated that the process depicted in FIG. 2 can be applied to multiple users of a user device and create or update multiple user activity profiles.

In step 210, user activity profile program 125 monitors device sensor(s). In an embodiment, user activity profile program 125 monitors one or more sensors of an electronic device, i.e., sensor(s) 140 of device 110, for user activity data associated with a user associated with the electronic device. In an embodiment, user activity profile program 125 stores the user activity data to database 135. In an embodiment, user activity profile program 125 stores the user activity data to a user activity profile in database 135.

In step 220, user activity profile program 125 monitors peripheral device(s) activity. In an embodiment, user activity profile program 125 monitors activity of peripheral device(s), e.g., peripheral device(s) 150, associated with the user of the electronic device, e.g., device 110. In an embodiment, user activity profile program 125 monitors sensor(s) 155, heart rate monitor 160, and sleep monitor 165 of peripheral device(s) 150 for user activity data associated with the user associated with device 110. In an embodiment, user activity profile program 125 stores the user activity data to database 135. In an embodiment, user activity profile program 125 stores the user activity data to a user activity profile in database 135.

In step 230, user activity profile program 125 determines a relationship between the device and the peripheral device(s). In an embodiment, user activity profile program 125 determines a relationship between device 110 and peripheral device(s) 150 based on proximity and activity of device 110 and peripheral device(s) 150. In an embodiment, user activity profile program 125 determines a relationship between device 110 and peripheral device(s) 150 based, at least in part, on a proximity between devices calculated by measuring transmit/receive times or by using Friis transmission equation. In an embodiment, user activity profile program 125 determines a relationship between device 110 and peripheral device(s) 150 based, at least in part, on the user activity data of device 110 and peripheral device(s) 150. For example, user activity profile program 125 may determine a user of device 110 is active (e.g., walking, running, swimming, etc.) based on a heart rate monitor of peripheral device 150 (e.g., smart watch worn by the user) and separated from device 110 (e.g., user left device 110 in user's vehicle). In another example, user activity profile program 125 may determine the user of device 110 is inactive (e.g., sitting on a couch, sleeping, etc.) yet still separated from device 110 (e.g., user left device 110 in another room of user's residence). In an embodiment, user activity profile program 125 stores determinations in database 135.

Figure 3:
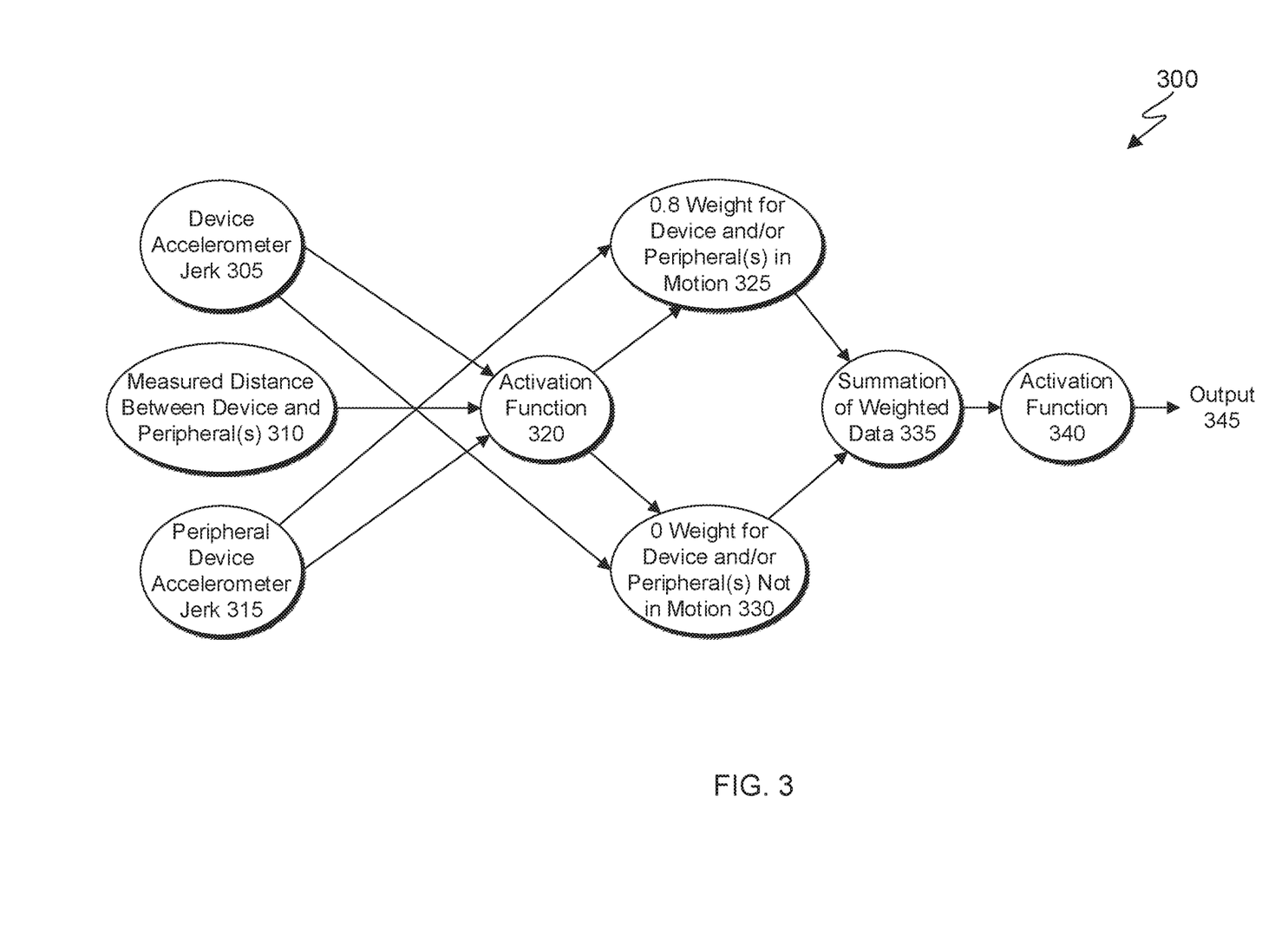
FIG. 3 depicts an exemplary node of a neural network used to create or update a user activity profile, in accordance with an embodiment of the present invention.

In step 240, user activity profile program 125 creates or updates a user activity profile. In an embodiment, during a first iteration, user activity profile program 125 creates a user activity profile for the user based on the data collected in steps 210, 220, and 230 and stored in database 135. In an embodiment, during subsequent iterations, user activity profile program 125 updates the user activity profile based on the data collected in steps 210, 220, and 230 and stored in database 135. In an embodiment, user activity profile program 125 utilizes a neural network that is created using supervised learning to process the data collected and stored in database 135. In an embodiment, user activity profile program 125 creates or updates a user activity profile based on the output of the neural network. FIG. 3 depicts an exemplary node 300 of an example neural network used by user activity profile program 125 to create or update a user activity profile, in accordance with an embodiment of the present invention. Node 300 is an example of one node that would form the full neural network to create or update a user activity profile. Other nodes (not shown) would consider additional data collected by user activity profile program 125, i.e., data from other sensors, heart rate data, calendar data, etc.

Exemplary node 300 of FIG. 3 depicts how the neural network would process accelerometer readings from device 110 and peripheral device 150. In FIG. 3, the neural network has three inputs: (1) accelerometer reading 305 from device 110, (2) accelerometer reading 315 from peripheral device 150, and (3) measured distance 310 between device 110 and peripheral device 150. With these inputs, the neural network uses activation function 320 to determine a weighting factor, which is based on measured distance 310, to apply to the input data readings. Activation function 320 is key to determining whether the user is inactive or simply not in possession of either device 110 or peripheral device 150. In other embodiments, additional inputs are used to increase the accuracy of the node, e.g., if the user is accelerating too fast, an additional input would be that the user is in a vehicle.

In exemplary node 300 in FIG. 3, if measured distance 310 between device 110 and peripheral device 150 is greater than 10 feet, weighting factor 325 of 0.8 is applied. Weighting factor 325 is applied to any device that is in motion. If the distance between the device 110 and peripheral device 150 is less than 10 feet, weighting factor 330 of 0 is applied. Weighting factor 330 is applied to any device not in motion. In several other embodiments, each device is given a different weighting factor, different weighting factors are applied during different times of the day, and/or unsupervised learning is used to adjust the weighting factor over time based on individual user activity levels on different devices and/or to learn relationships between device measurements (i.e., normalizing data).

Node 300 continues by adding the weighted data together to get a summation of weighted data 335. Summation of weighted data 335 is passed through activation function 340 to provide output 345. For example, if a rectified linear unit (ReLU) activation function is applied to the summation of weighted data 335, output 345 will either be zero "0" if the summation of weighted data 335 is less than a threshold level or will be the sum of the weighted data 335. The output 345 will be used along with other nodes in the neural network to determine a user's activity level and update an associated user activity profile.

Figure 4:
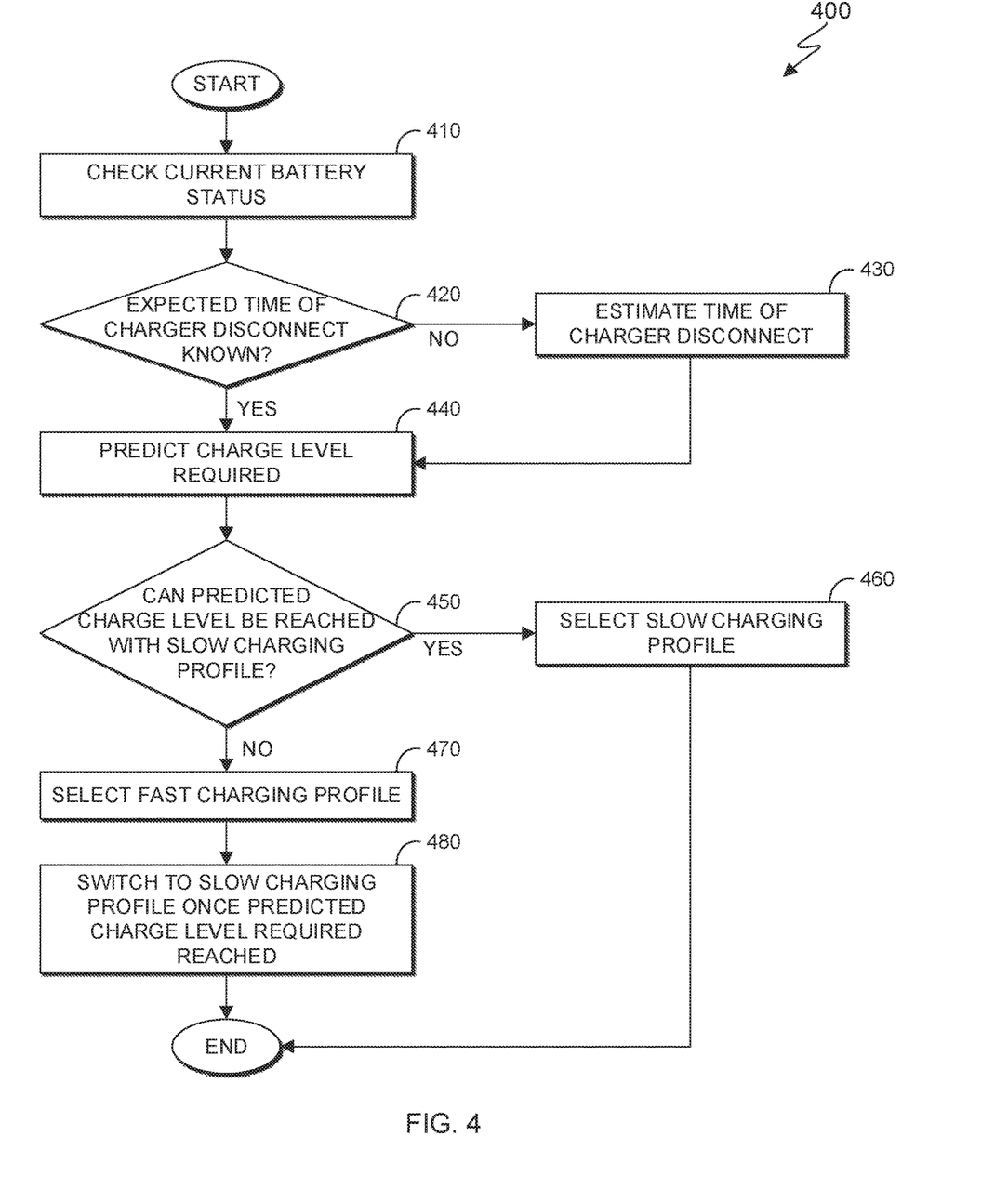
FIG. 4 depicts a flowchart of the steps of a charging profile selection program, in accordance with an embodiment of the present invention.

FIG. 4 depicts a flowchart of the steps of charging profile selection program 130, in accordance with an embodiment of the present invention. In the depicted embodiment, responsive to determining an electronic device is connected to a battery charging device, charging profile selection program 130 determines a charging profile to implement based on a current battery status and an expected or estimated time of charger disconnect. It should be appreciated that the process depicted in FIG. 4 illustrates one possible iteration of charging profile selection program 130, which initiates upon connection of an electronic device to a battery charging device, e.g., upon connection of device 110 to charger 170. In other embodiments, it should also be appreciated that the process depicted in FIG. 4 can be applied to multiple users of a user device. In these embodiments, charging profile selection program 130 must also determine which user is utilizing device 110 during a specified time period (e.g., a day, week, etc.). In these embodiments, charging profile selection program 130 determines which user is utilizing device 110 through a biometric reading (e.g., facial recognition, fingerprint, etc.) and/or through sign-in credentials.

In step 410, charging profile selection program 130 checks the current battery status. In an embodiment, charging profile selection program 130 checks the current battery status of rechargeable battery 120. Battery status of a rechargeable battery, e.g., rechargeable battery 120, includes, but is not limited to, a current state of charge or depth of charge, current temperature, current state of health of the battery, and/or number of charge-discharge cycles (aging of the battery). For example, a brand-new battery that has only been through 10 discharge cycles may have a state of health of 99% and a state of charge of 20%. In another example, a battery that has gone through 400 discharge cycles may have a state of health of 60% and state of charge of 50%.

It is known to a person of skill in the art that off-the-shelf batteries contain integrated circuits (ICs) that monitor such battery status information based on instantaneous measurements and historic data. In some embodiments, the electronic device monitors a number of charge/discharge cycles and predicts the state of health and state of charge data displayed on the electronic device. A person of skill in the art can appreciate that this is common with mobile phones and laptops. In these embodiments, charging profile selection program 130 checks the current battery status kept in a database of the electronic device, e.g., database 135 of device 110.

In decision 420, charging profile selection program 130 determines whether an expected time of charger disconnect is known. In an embodiment, charging profile selection program 130 determines whether the expected time of charger disconnect is known based, at least in part, on the one or more users' calendars. In an embodiment, charging profile selection program 130 determines whether the expected time of charger disconnect is known based, at least in part, on an estimated time of arrival (ETA) on a global positioning system (GPS) in a vehicle or on the electronic device, e.g., device 110. For example, charging profile selection program 130 determines that one or more users will arrive at their destination in 30 minutes, so charging profile selection program 130 determines the expected time of charger disconnect to be in 30 minutes when the destination is reached.

If charging profile selection program 130 determines the expected time of charger disconnect is not known (decision 420, NO branch), charging profile selection program 130 proceeds to step 430. If charging profile selection program 130 determines the expected time of charger disconnect is known (decision 420, YES branch), charging profile selection program 130 proceeds to step 440.

In step 430, charging profile selection program 130 estimates a time of charger disconnect. In an embodiment, responsive to determining that the expected time of charger disconnect is not known, charging profile selection program 130 estimates a time of charger disconnect based on the one or more user activity profiles. In an embodiment, charging profile selection program 130 uses the one or more user activity profiles to estimate when the one or more users is likely to unplug the electronic device from the battery charging device, e.g., disconnecting device 110 from charger 170.

For example, based on learned data from the neural network utilized by user activity profile program 125, a user may become more active around 5 pm (i.e., leaving from work), so if device 110 is connected to charger 170 at 3 pm and there are no scheduled events in the user's calendar, charging profile selection program 130 estimates that device 110 will be charging for 2 hours. In another example, if a user typically goes to bed around 11 pm based on heart rate monitor 160 and/or sleep monitor 165, sleeps for 7 hours, and typically has little activity one hour before going to bed, but connects device 110 to charger 170 at 10 pm, charging profile selection program 130 estimates that device 110 will be charging for 8 hours even though there is still activity being registered during that one hour before bed (i.e., user walking around their house). In yet another example, if a user is in a recreational sports league on Tuesdays at 7 pm and device 110 is connected to charger 170 at 6 pm, charging profile selection program 130 estimates that device 110 will be charging for 45 minutes until the user has to leave for the recreational sports league.

In step 440, charging profile selection program 130 predicts a charge level required. The charge level required is the charge level needed for rechargeable battery 120 of device 110 to make it (not drain to 0%) the remainder of a user's day or until a next charging session based on the user activity profile. In an embodiment, charging profile selection program 130 predicts a charge level required for device 110 based on the user activity profile and the current state of health of rechargeable battery 120 checked in step 410. In an embodiment, charging profile selection program 130 reviews the user activity profile stored in database 135.

Continuing the example above of the user leaving work at 5 pm, after charging profile selection program 130 reviews the user activity profile and determines the user is active until 10 pm, charging profile selection program 130 predicts a charge level of 60% is required for device 110 to last from 5 pm to 10 pm. Continuing the example above of the user that typically goes to bed around 11 pm, after charging profile selection program 130 reviews the user activity profile and determines device 110 will need to last until 11 pm the next day, charging profile selection program 130 predicts a charge level of 100% is required for device 110. Continuing the example above of the user in a recreational sports league, after charging profile selection program 130 reviews the user activity profile and determines device 110 will need to last from 7 pm to 10 pm at which time the user is usually back home with low activity levels, charging profile selection program 130 predicts a charge level of 35% is required for device 110.

In decision, 450, charging profile selection program 130 determines whether the predicted charge level can be reached with slow charging profile. In an embodiment, charging profile selection program 130 determines whether the predicted charge level required can be reached within the expected or estimated charger disconnect time with a slow charging profile. In an embodiment, charging profile selection program 130 compares the current state of charge checked in step 410 with the predicted charge level required to determine if the predicted charge level required can be achieved before the time of charger disconnect using a slow charging profile.

If charging profile selection program 130 determines the predicted charge level can be reached with slow charging profile (decision 450, YES branch), charging profile selection program 130 proceeds to step 460, in which charging profile selection program 130 selects the slow charging profile. Continuing the example above of the user leaving work at 5 pm and it is currently 3 pm, if charging profile selection program 130 determined the current state of charge to be 40%, the expected time of disconnect to be 2 hours, and the predicted charge level required to be 60%, charging profile selection program 130 determines the predicted charge level required can be reached using the slow charging profile. Continuing the example above of the user going to bed at 11 pm, if charging profile selection program 130 determined the current state of charge to be 6%, the expected time of disconnect to be 8 hours, and the predicted charge level required to be 100%, charging profile selection program 130 determines the predicted charge level required can be reached using the slow charging profile. In an embodiment, charging profile selection program 130 sends the selected slow charging profile to a processor of the charging device, e.g., processor 176 of charger 170 in FIG. 5.

If charging profile selection program 130 determines the predicted charge level cannot be reached with the slow charging profile (decision 450, NO branch), charging profile selection program 130 proceeds to step 470. In step 470, charging profile selection program 130 selects the fast charging profile. Continuing the example above of the user in the recreational sports league, if charging profile selection program 130 determined the current state of charge to be 10%, the expected time of disconnect to be 45 minutes, and the predicted charge level required to be 35%, charging profile selection program 130 determines the predicted charge level required cannot be reached using the slow charging profile, so charging profile selection program 130 selects the fast charging profile. In an embodiment, charging profile selection program 130 sends the selected fast charging profile to a processor of the charging device, e.g., processor 176 of charger 170 in FIG. 5.

In step 480, charging profile selection program 130 switches to the slow charging profile once the predicted charge level required is reached. In an embodiment, responsive to the predicted charge level required being reached, charging profile selection program 130 switches to the slow charging profile. In an embodiment, if device 110 is still connected to charger 170 when the predicted charge level required is reached, charging profile selection program 130 switches to the slow charging profile. In an embodiment, charging profile selection program 130 tells a processor of the charging device to switch from the fast charging circuitry to the slow charging circuitry, e.g., processor 176 of charger 170 in FIG. 5.

Figure 5:
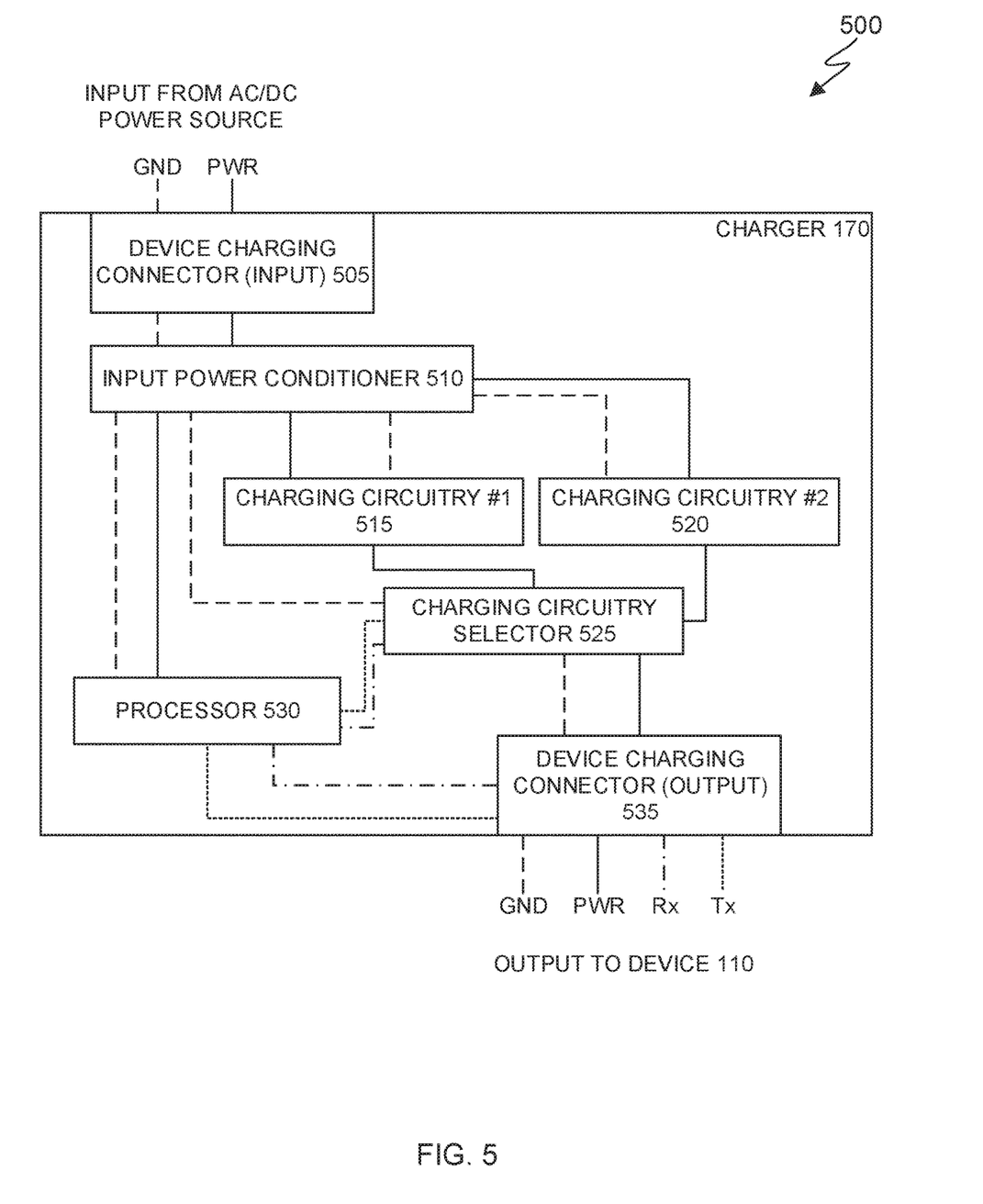
FIG. 5 depicts a circuit diagram of a charger of the distributed data processing environment, in accordance with an embodiment of the present invention.

FIG. 5 depicts a circuit diagram 500 of charger 170 of distributed data processing environment 100, in accordance with an embodiment of the present invention. In the depicted embodiment, charger 170 comprises device charging connector input 505, input power conditioner 510, charging circuitry #1 515, charging circuitry #2 520, charging circuitry selector 525, processor 530, and device charging connector output 535. In this embodiment, charger 170 includes wired charging connector inputs and outputs. In other embodiments (not shown), charger 170 includes wireless charging inputs and outputs. In the depicted embodiment, charger 170 is connected to device 110, but it can be appreciated that in other embodiments, charger 170 is connected to other electronic devices, e.g., peripheral device(s) 150.

Device charging connector input 505 takes alternating current (AC) or direct current (DC) input from an outside power source, e.g., 120 volts (V) AC wall outlet, 12V DC output from an auxiliary port in a vehicle, etc. The input power is conditioned by input power conditioner 510 to output voltage levels required to power the remainder of the circuitry within charger 170, e.g., outputting 5V DC and/or 3.3V DC.

Charging circuitry #1 515 and charging circuitry #2 520 take input from input power conditioner 510 to output different current levels at device 110's charge voltage (e.g., 5V DC) for fast charging (e.g., 2 amperes (A)) or slow charging (e.g., 0.25A). Processor 530 communicates with device 110 via transmit (Tx) and receive (Rx) lines to obtain charging profile selection determined by charging profile selection program 130 and uses this selection to interface with charging circuitry selector 525.

Charging circuitry selector 525 acts as a switch to pass charge current at device 110's charge voltage through based on commands received from processor 530, i.e., voltage and current from either charging circuitry #1 515 or charging circuitry #2 520. The output voltage and current from charging circuitry selector 525 is passed through to device charging connector output 535, which is the output to charge device 110.

Figure 6:
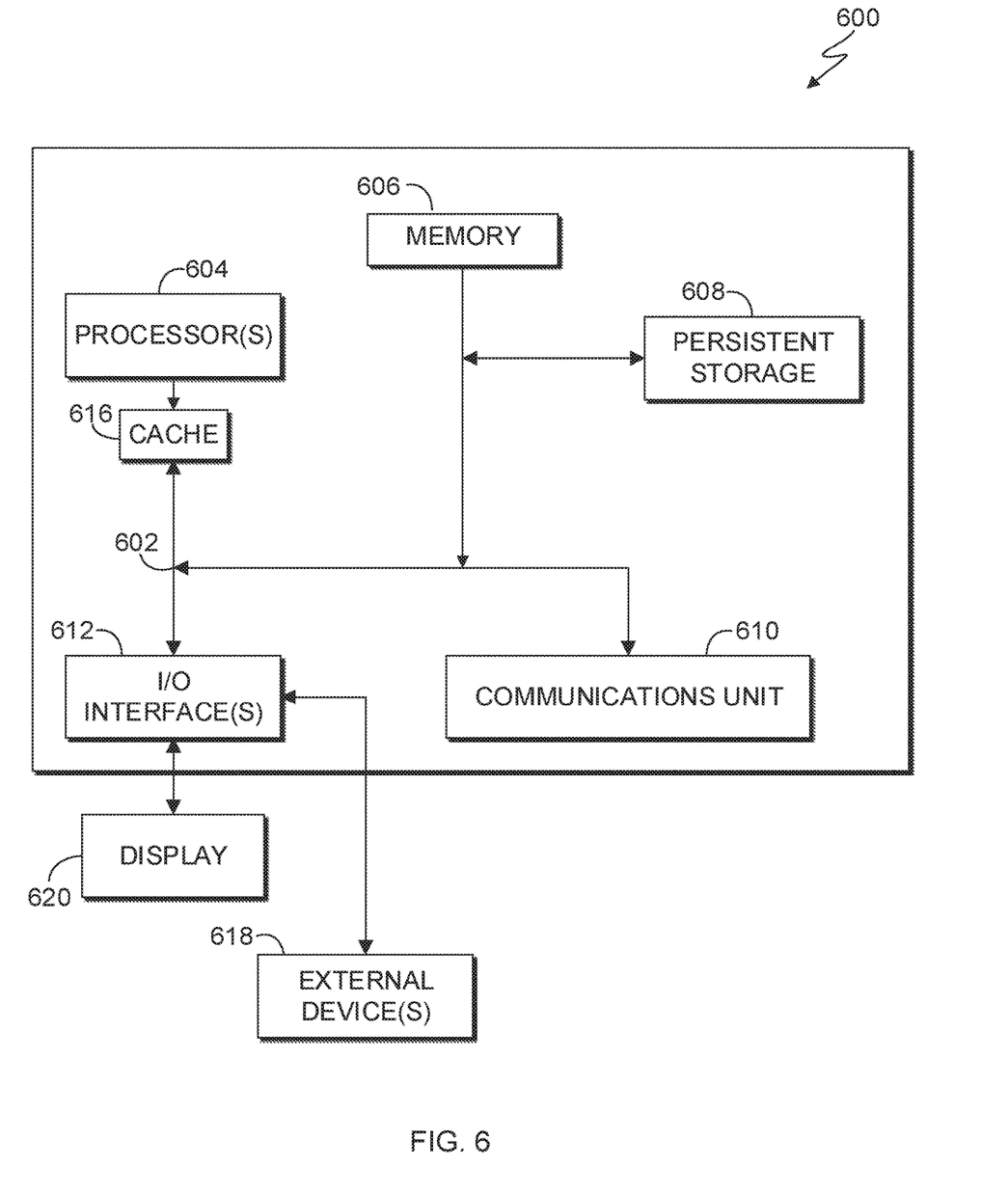
FIG. 6 depicts a block diagram of a computing device of the distributed data processing environment, in accordance with an embodiment of the present invention.

FIG. 6 depicts a block diagram of components of a computing device 600 suitable for device 110 and/or peripheral device(s) 150, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 600 includes communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Programs may be stored in persistent storage 608 and in memory 606 for execution and/or access by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Programs may be downloaded to persistent storage 608 through communications unit 610.

I/O interface(s) 612 allows for input and output of data with other devices that may be connected to device 110 and/or peripheral device(s) 150. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   responsive to an electronic device with a rechargeable battery being connected to a battery charging device, identifying, by one or more processors, a current battery status of the rechargeable battery;
   determining, by the one or more processors, a disconnect time of the battery charging device based, at least in part, on a user activity profile of a user of the electronic device, wherein the user activity profile is based on movement of the electronic device in relation to linked peripheral devices;

determining, by the one or more processors, a charge level required based, at least in part, on the user activity profile of the user of the electronic device;

determining, by the one or more processors, a charging profile based on the current battery status, the disconnect time of battery charging device, and the charge level required; and sending, by the one or more processors, the charging profile to the battery charging device.

2. The computer-implemented method of claim 1, wherein identifying the current battery status of the rechargeable battery comprises:

identifying, by the one or more processors, at least one of a current state of charge, a current temperature, a current state of health, and number of charge-discharge cycles.

3. The computer-implemented method of claim 1, further comprising:

creating and updating, by the one or more processors, the user activity profile of the user of the electronic device by collecting user activity data through a plurality of sensors of the electronic device and a plurality of sensors of at least one peripheral device of the linked peripheral devices, determining a proximity between the electronic device and the at least one peripheral device when the user activity data is collected, and utilizing a neural network to process the user activity data.

4. The computer-implemented method of claim 3, wherein the charge level required is a charge level required for the rechargeable battery of the electronic device to make it a remainder of the user's day or until a next charging session based on the user activity profile.

5. The computer-implemented method of claim 1, wherein determining the charging profile based on the current battery status, the disconnect time of battery charging device, and the charge level required comprises:

determining, by the one or more processors, whether the charge level required can be reached with a slow charging profile by comparing the current battery status to the charge level required to determine if the charge level required can be reached with the slow charging profile before the disconnect time of battery charging device.

6. The computer-implemented method of claim 1, wherein sending the charging profile to the battery charging device comprises:

sending, by the one or more processors, the charging profile to a processor of the battery charging device, wherein the processor acts as a switch to select an output charge current of a set of adjustable charging circuitry of the battery charging device based on the charging profile.

7. A computer program product comprising:

one or more computer readable storage media and program instructions stored on the one or more computer readable storage media, the program instructions comprising:

program instructions to, responsive to an electronic device with a rechargeable battery being connected to a battery charging device, identify a current battery status;

program instructions to determine a disconnect time of the battery charging device based, at least in part, on a user activity profile of a user of the electronic device, wherein the activity profile is based on movement of the electronic device in relation to linked peripheral devices;

program instructions to determine a charge level required based, at least in part, on the user activity profile of the user of the electronic device;

program instructions to determine a charging profile based on the current battery status, the disconnect time of battery charging device, and the charge level required; and program instructions to send the charging profile to the battery charging device.

8. The computer program product of claim 7, wherein the program instructions to identify the current battery status of the rechargeable battery comprise:

program instructions to identify at least one of a current state of charge, a current temperature, a current state of health, and number of charge-discharge cycles.

9. The computer program product of claim 7, further comprising:

program instructions to create and update the user activity profile of the user of the electronic device by collecting user activity data through a plurality of sensors of the electronic device and a plurality of sensors of at least one peripheral device of the linked peripheral devices, determining a proximity between the electronic device and the at least one peripheral device when the user activity data is collected, and utilizing a neural network to process the user activity data.

10. The computer program product of claim 9, wherein the charge level required is a charge level required for the rechargeable battery of the electronic device to make it a remainder of the user's day or until a next charging session based on the user activity profile.

11. The computer program product of claim 7, wherein the program instructions to determine the charging profile based on the current battery status, the disconnect time of battery charging device, and the charge level required comprise:

program instructions to determine whether the charge level required can be reached with a slow charging profile by comparing the current battery status to the charge level required to determine if the charge level required can be reached with the slow charging profile before the disconnect time of battery charging device.

12. The computing program product of claim 7, wherein the program instructions to send the charging profile to the battery charging device comprise:

program instructions to send the charging profile to a processor of the battery charging device, wherein the processor acts as a switch to select an output charge current of a set of adjustable charging circuitry of the battery charging device based on the charging profile.

13. A computer system comprising:

one or more computer processors;

one or more computer readable storage media;

program instructions stored on the computer readable storage media for execution by at least one of the one or more processors, the program instructions comprising:

program instructions to, responsive to an electronic device with a rechargeable battery being connected to a battery charging device, identify a current battery status;

program instructions to determine a disconnect time of the battery charging device based, at least in part, on a user activity profile of a user of the electronic device, wherein the user activity profile is based on movement of the electronic device in relation to linked peripheral devices;

program instructions to determine a charge level required based, at least in part, on the user activity profile of the user of the electronic device;

program instructions to determine a charging profile based on the current battery status, the disconnect time of battery charging device, and the charge level required; and program instructions to send the charging profile to the battery charging device.

14. The computer system of claim 13, wherein the program instructions to identify the current battery status of the rechargeable battery comprise:

program instructions to identify at least one of a current state of charge, a current temperature, a current state of health, and number of charge-discharge cycles.

15. The computer system of claim 13, further comprising:

program instructions to create and update the user activity profile of the user of the electronic device by collecting user activity data through a plurality of sensors of the electronic device and a plurality of sensors of at least one peripheral device of the linked peripheral devices, determining a proximity between the electronic device and the at least one peripheral device when the user activity data is collected, and utilizing a neural network to process the user activity data.

16. The computer system of claim 15, wherein the charge level required is a charge level required for the rechargeable battery of the electronic device to make it a remainder of the user's day or until a next charging session based on the user activity profile.

17. The computer system of claim 13, wherein the program instructions to determine the charging profile based on the current battery status, the disconnect time of battery charging device, and the charge level required comprise:

program instructions to determine whether the charge level required can be reached with a slow charging profile by comparing the current battery status to the charge level required to determine if the charge level required can be reached with the slow charging profile before the disconnect time of battery charging device.

* * * * *